US012705971B2

(12) United States Patent
Barrieau et al.

(10) Patent No.: US 12,705,971 B2
(45) Date of Patent: Aug. 11, 2026

(54) PREMISES INTERSYSTEM OPERATIONS

(71) Applicant: Johnson Controls Tyco IP Holdings LLP, Milwaukee, WI (US)

(72) Inventors: Christopher Mark Barrieau, Shirley, MA (US); Dennis Allen Mcevoy, Charlotte, NC (US); Richard Paul Bonneau, Templeton, MA (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 3 days.

(21) Appl. No.: 18/853,994

(22) PCT Filed: Mar. 30, 2023

(86) PCT No.: PCT/US2023/016948
§ 371 (c)(1),
(2) Date: Oct. 3, 2024

(87) PCT Pub. No.: WO2023/192507
PCT Pub. Date: Oct. 5, 2023

(65) Prior Publication Data

US 2025/0225861 A1 Jul. 10, 2025

Related U.S. Application Data

(60) Provisional application No. 63/325,365, filed on Mar. 30, 2022.

(51) Int. Cl.
*G08B 29/18* (2006.01)
*G08B 17/00* (2006.01)

(52) U.S. Cl.
CPC ........... *G08B 29/188* (2013.01); *G08B 17/00* (2013.01)

(58) Field of Classification Search
CPC ...... G08B 29/188; G08B 17/00; G08B 25/14; G08B 19/00
See application file for complete search history.

(56) References Cited

U.S. PATENT DOCUMENTS

| | | | | |
|---|---|---|---|---|
| 5,475,364 | A | 12/1995 | Kenet | |
| 9,739,489 | B2 | 8/2017 | Ronk | |
| 2007/0114280 | A1 | 5/2007 | Coop | |
| 2013/0049940 | A1 * | 2/2013 | Carrieri | G08B 19/005 340/288 |

(Continued)

FOREIGN PATENT DOCUMENTS

| | | | |
|---|---|---|---|
| CN | 100 561 534 | C | 11/2009 |
| WO | 2017117641 | A1 | 7/2017 |

OTHER PUBLICATIONS

International Search Report and Written Opinion issued in corresponding International Application No. PCT/US2023/016948 dated Jul. 12, 2023.

*Primary Examiner* — Quan Zhen Wang
*Assistant Examiner* — Rajsheed O Black-Childress
(74) *Attorney, Agent, or Firm* — ArentFox Schiff LLP

(57) ABSTRACT

A premises system may select a sensor of a fire protection subsystem. A premises system may select one or more elements of the one or more other subsystems. A premises system may collect data across the selected sensors and selected elements for a period of time. A premises system may analyze the collected data for correlation among the selected sensors and selected elements.

16 Claims, 6 Drawing Sheets

(56) References Cited

U.S. PATENT DOCUMENTS

| | | | | |
|---|---|---|---|---|
| 2015/0100167 | A1* | 4/2015 | Sloo | G08B 29/26 700/278 |
| 2017/0134895 | A1 | 5/2017 | Rabb | |
| 2018/0061211 | A1 | 3/2018 | Piccolo, III | |
| 2018/0227141 | A1 | 8/2018 | Zribi | |
| 2019/0244504 | A1 | 8/2019 | Ebata | |
| 2021/0027613 | A1 | 1/2021 | Sahai | |
| 2021/0208546 | A1* | 7/2021 | Locke | G05B 13/0265 |
| 2022/0172591 | A1 | 6/2022 | Solis | |

* cited by examiner

PREMISES INTERSYSTEM OPERATIONS

CROSS REFERENCE TO RELATED APPLICATIONS

This patent application is a National Stage of International Patent Application No. PCT/US2023/016948, filed on Mar. 30, 2023, claims priority to U.S. Provisional Application No. 63/325,365 filed Mar. 30, 2022, which is assigned to the assignee hereof and incorporated by reference herein.

FIELD OF THE DISCLOSED TECHNOLOGY

The present disclosure relates generally to premises safety/automation systems, and more specifically, to intersystem operations between fire safety subsystems and other premises subsystems.

SUMMARY OF THE INVENTION

The disclosed aspects will hereinafter be described in conjunction with the appended drawings, provided to illustrate and not to limit the disclosed aspects, wherein like designations denote like elements.

In some aspects, the techniques described herein relate to a method for operating a premises system, the premises system including a fire protection subsystem and one or more other subsystems, the method including: selecting a sensor of a fire protection subsystem; selecting one or more elements of the one or more other subsystems; collecting data across the selected sensors and selected elements for a period of time; and analyzing the collected data for correlation among the selected sensors and selected elements.

In some aspects, the techniques described herein relate to a method, wherein selecting a sensor is automatically performed by the premises system based on a predetermined sub-alarm threshold level for the sensor.

In some aspects, the techniques described herein relate to a method, wherein selecting one or more element is based on physical proximity of an element with the selected sensor.

In some aspects, the techniques described herein relate to a method, wherein physical proximity includes a physical range of the selected sensor.

In some aspects, the techniques described herein relate to a method, wherein other subsystems include one or more of an access control system, an intrusion system, and a building system (e.g., HVAC).

In some aspects, the techniques described herein relate to a method, wherein one or more elements include one or more of a door switch, a heater, a thermometer, a camera, a beacon/sounder pull station, a smoke detector, a thermostat, an intrusion motion sensor, an access card reader, an access keypad, and a door contact.

In some aspects, the techniques described herein relate to a method, wherein collecting includes increasing a resolution in one or more of time and sensor granularity of at least one selected sensor for the period of time.

In some aspects, the techniques described herein relate to a method, wherein analyzing includes identifying one or more action recommendations for reconfiguration of the premises system.

In some aspects, the techniques described herein relate to a method, further including presenting the identified one or more action recommendations to a user via a user interface of the premises system; receiving user selection of the presented one or more of the action recommendations; and implementing the reconfiguration of the selected action recommendation.

In some aspects, the techniques described herein relate to a premises system, including: a fire safety subsystem; at least one other subsystem; a memory; and at least one processor coupled to the memory, the memory including instructions executable by the at least one processor to cause the premises system to: select a sensor of a fire protection subsystem; select one or more elements of the at least one other subsystem; collect data across the selected sensors and elements for a period of time; and analyze the collected data for correlation among the selected sensors and elements.

In some aspects, the techniques described herein relate to a system, wherein selecting a sensor is automatically performed by the premises system based on a predetermined sub-alarm threshold level for the sensor.

In some aspects, the techniques described herein relate to a system, wherein selecting one or more element is based on physical proximity of an element with the selected sensor.

In some aspects, the techniques described herein relate to a system, wherein physical proximity includes a physical range of the selected sensor.

In some aspects, the techniques described herein relate to a system, wherein other subsystems include one or more of an access control system, an intrusion system, and a building system.

In some aspects, the techniques described herein relate to a system, wherein: analyzing includes identifying one or more action recommendations for reconfiguration of the premises system; and the instructions, when executed by the at least one processor, further causes the premises system to: present the identified one or more action recommendations to a user via a user interface of the premises system; receive user selection of the presented one or more of the action recommendations; and implement the reconfiguration of the selected action recommendation.

In some aspects, the techniques described herein relate to a computer-readable medium storing processor-executable code, the code when read and executed by at least one processor of a premises system including a fire safety subsystem and at least one other subsystem, causes the premises system to: select a sensor of a fire protection subsystem; select one or more elements of the one or more other subsystems; collect data across the selected sensors and elements for a period of time; and analyze the collected data for correlation among the selected sensors and elements.

In some aspects, the techniques described herein relate to a computer-readable medium, wherein selecting a sensor is automatically performed by the premises system based on a predetermined sub-alarm threshold level for the sensor.

In some aspects, the techniques described herein relate to a computer-readable medium, wherein selecting one or more element is based on physical proximity of an element with the selected sensor.

In some aspects, the techniques described herein relate to a computer-readable medium, wherein physical proximity includes a physical range of the selected sensor.

In some aspects, the techniques described herein relate to a computer-readable medium, wherein: analyzing includes identifying one or more action recommendations for reconfiguration of the premises system; and the code when read and executed by at least one processor of the premises system, further causes the premises system to: present the identified one or more action recommendations to a user via a user interface of the premises system; receive user selection of the presented one or more of the action recommendations; and implement the reconfiguration of the selected action recommendation.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Under typical conditions, a premises fire protection system polls devices (such as sensors) for values under predetermined conditions (e.g., set intervals, nominal sensor granularity and nominal thresholds) to meet the fire protection system's monitoring objectives. However, such predetermined conditions may not be sufficient to analyze the sensor's applicability or response to certain circumstances or to interaction with other systems, such as building heating ventilation and air conditioning (HVAC), access control systems, and intrusion detection systems.

Examples of the technology disclosed herein select certain fire protection system sensors for monitoring in conjunction with one or more elements of other premises systems, and then gather data on the selected sensors and elements. The gathered data is analyzed for correlation from which recommendations may be derived, e.g., by artificial intelligence systems employing expert systems and machine learning. The recommendations can be presented to a user for selection, and the system can implement those selected recommendations in the premises systems.

Turning now to the figures, example aspects are depicted with reference to one or more components described herein, where components in dashed lines may be optional.

Figure 1:
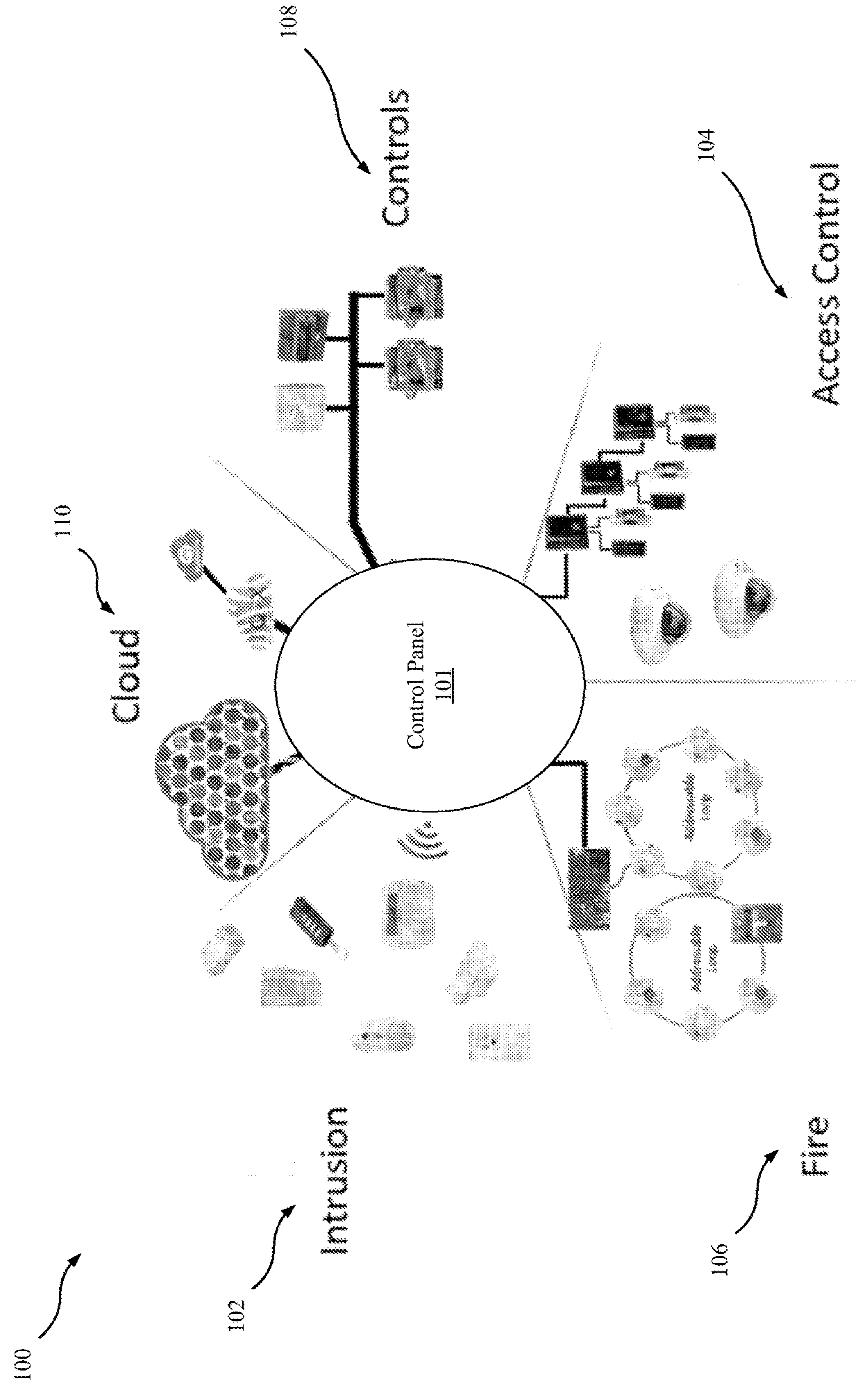
FIG. 1 is a schematic diagram of an example premises environment platform including a control panel configured for combining a fire protection system with one or more other safety/automation systems, in accordance with examples of the technology disclosed herein.

Referring to FIG. 1, in a non-limiting example, a premises environment platform 100 has a scalable and extensible modular architecture for providing an autonomous building system/premises system. The premises environment platform 100 may combine and harmonize various building systems, such as but not limited to a building intrusion system 102 configured to detect a potential intruder, an access control system 104 configured to limit access to the premises to authorized persons, a fire protection system 106 configured to detect and indicate potential fire, smoke, or other safety-related events, a building controls system 108 configured to manage one or more of a plurality of devices, components, or functions within the premises, etc.

In one non-limiting example aspect, the premises environment platform 100 may include a control panel 101 that provides not only the functionality of the building intrusion system 102 but also receives input data from, and/or controls, various other building devices associated with other systems, such as the fire protection system 106, the access control system 104, the building controls system 108, etc. Examples of the various devices that are communicatively coupled with the control panel 101 may include addressable fire beacon/sounder pull stations, smoke detectors, thermostats, intrusion motion sensors, access card readers, access keypads, door contacts, etc. The control panel 101 may also be communicatively coupled with a cloud system 110 that provides cloud-based support for the operation of the premises environment platform 100 or any of the building systems integrated within the premises environment platform 100 such as the building intrusion system 102, the access control system 104, the fire protection system 106, the building controls system 108, etc.

Figure 2:
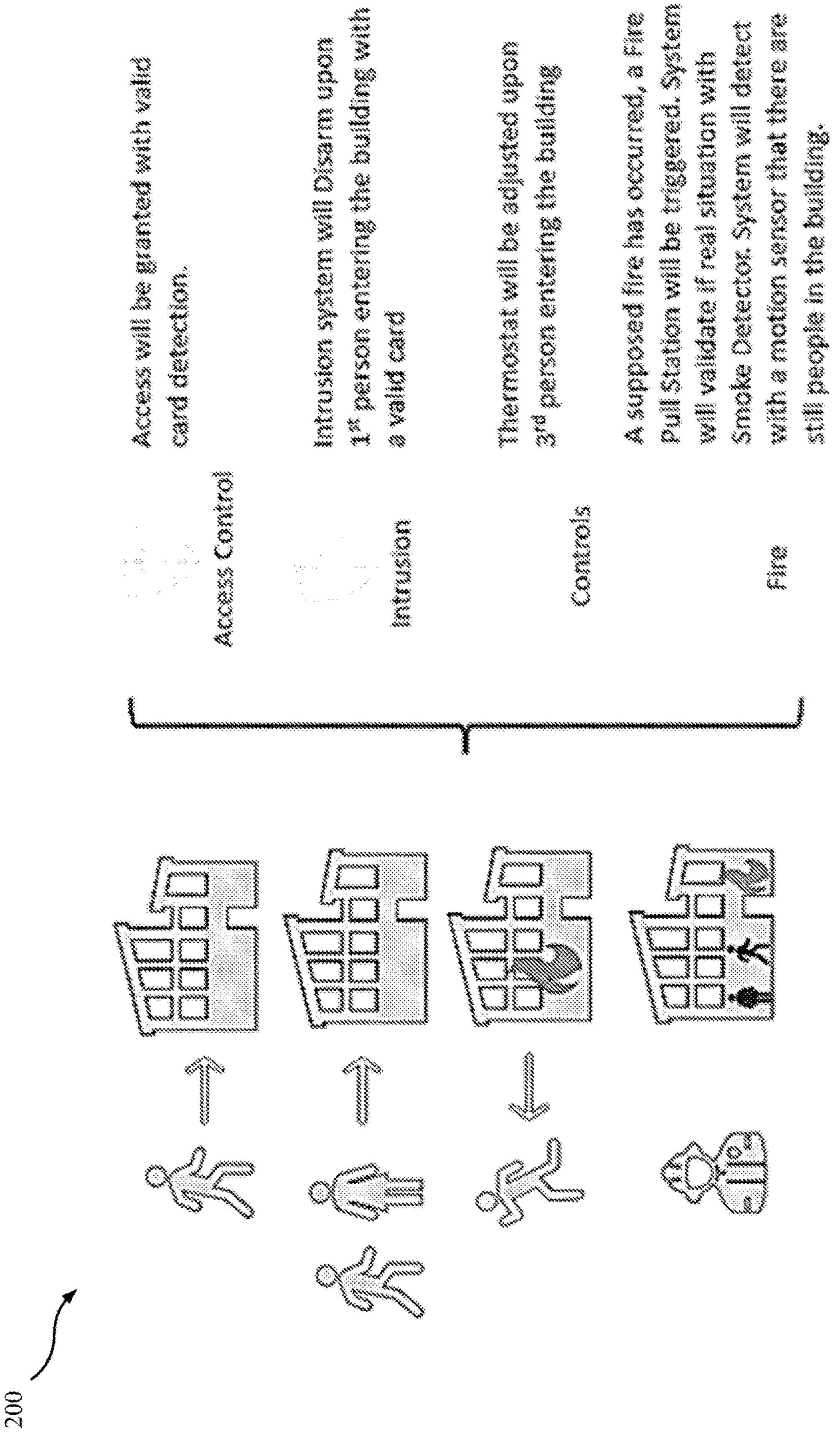
FIG. 2 is a schematic diagram of an example user flow of the example premises environment platform of FIG. 1, in accordance with examples of the technology disclosed herein.

Referring to FIG. 2, in one non-limiting aspect, an example user flow 200 of the operation of the premises environment platform 100 (e.g., in a small business environment) may combine/integrate the functionality of a building access system with the functionality of the building fire system and the building heating, ventilation, and air conditioning (HVAC) system. For example, the access control system may grant access with a valid card detection. Then, the intrusion system may disarm upon a first person entering the building with a valid card. Then, the building controls may adjust a thermostat upon a third person entering the building. Then, if a supposed fire occurs and a fire pull station is triggered, the fire protection system may validate if the fire is real, for example, based on the output of one or more smoke detectors. The system may also detect, e.g., based on motion detection by a motion sensor, that there are still people in the building.

The premises environment platform 100 may provide various customer results/outcomes, such as reduced cost of ownership (e.g., energy savings, operational savings, water savings, increased carbon offsets, etc.), improved operational efficiency (e.g., healthy building indicator, occupancy mapping, heat mapping for HVAC systems, etc.), prevention (e.g., advanced emergency medical service (EMS)/life safety, early system failures, false alarms, etc.), tenant satisfaction (e.g., clear and healthy air, safe environments, hassle free to focus on tasks, etc.), smart and connected environment (e.g., cloud analytics, leveraging external data (e.g., weather, local energy costs, etc.), services, etc.), etc.

The customers may be, for example, direct customers that are people who are directly associated with the building, such as workers working inside the building, a company or tenant in a multi-dwelling unit, property managers, building owners, etc. The customers may also be indirect customers such as people who would indirectly benefit from the premises environment platform 100.

The customer outcomes of the premises environment platform 100 may drive opportunities for services. For example, the premises environment platform 100 may provide a dashboard that illustrates various graphs of operational data such as energy utilization, utilization mapping, and operating costs/savings, to a property manager or owner. Such information may be used, for example, to determine the monthly rent rates for the units in a building. Accordingly, the premises environment platform 100 may provide a foundation for services related to energy. Similar functionality may be implemented for water usage, for example.

In examples of the technology disclosed herein, the platform 100 can use collected data to identify correlations among the selected sensors and selected elements. In such examples, the technology can identify one or more action recommendations for reconfiguration of the premises system, and then present the identified one or more action recommendations to a user via a user interface of the premises system. In some such examples, the technology can receive user selection of the presented one or more of the action recommendations. In some such examples, the technology can implement the reconfiguration of the selected action recommendation.

Figure 3:
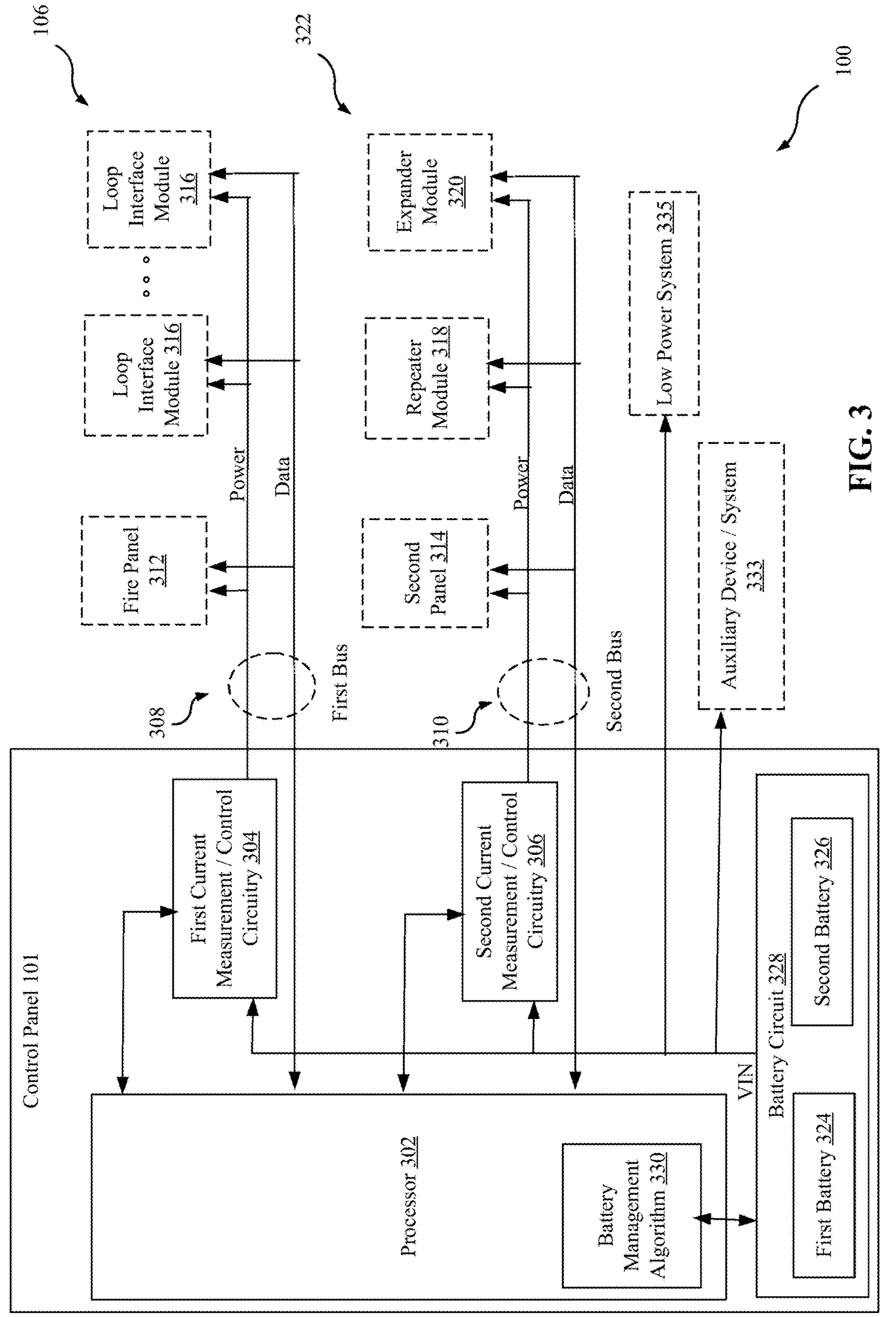
FIG. 3 is a block diagram of an example of the control panel for a fire protection system and another safety/automation systems, according to some aspects of the present disclosure.

Referring to FIG. 3, in some non-limiting example aspects, the control panel 101 of the premises environment platform 100 may include hardware aspects to support and/or combine a fire protection system 106 and at least one other safety/automation system 322, where the safety/automation system 322 may be, but is not limited to, an intrusion system, a premises automation system, an access control system, a building controls system, etc. In order to have the fire protection system 106 and the safety/automation system 322 provided by the hardware in a single box (the control panel 101), there are certain considerations to take into account in order to meet the fire code standards. For example, in some aspects, the hardware of the control panel 101 is implemented to meet fire code standards despite any connections of the control panel 101 to the safety/automation system 322 and despite any functionality provided by the control panel 101 to the safety/automation system 322. The control panel 101 may also include further aspects to meet the standards requirements of the safety/automation system 322. For example, when the safety/automation system 322 is an intrusion system, the control panel 101 may be configured to meet residential or commercial burglary security standards.

In some aspects, for example, fire approvals require that adding any functionality related to the safety/automation system 322 to the control panel 101 does not interfere with the operation of the fire protection system 106. Accordingly, for example, when the safety/automation system 322 is an intrusion system, security devices of the intrusion system are not placed on a same bus as fire protection devices of the fire protection system 106. Instead, some present aspects meet the standard/safety requirements of the fire protection system 106 by implementing hardware and supporting software in the control panel 101 to isolate and separate the fire protection system 106 from the safety/automation system 322.

For example, in some aspects, the control panel 101 may include a first bus 308 for input/output communication with, and for providing power to, one or more components of the fire protection system 106, and a second bus 310 for input/output communication with, and for providing power to, one or more components of the safety/automation system 322. In these aspects, since non-fire-related devices are not added on the circuit that is serving the fire protection equipment of the fire protection system 106, the non-fire-related devices do not interfere with the fire protection devices of the fire protection system 106, and vice versa.

For example, due to the separation of the first bus 308 and the second bus 310, a bus issue in the safety/automation system 322 (such as a surge, fault, etc. in the safety/automation system 322) does not affect the operation of the fire protection system 106. Further, the first bus 308 may have a configuration (e.g., wire gauge, etc.) that meets fire codes/standards and is different than a respective configuration of the second bus 310 (e.g., wire gauge, etc. of the second bus 310). Further, in some aspects, the second bus 310 may have a configuration (e.g., wire gauge, etc.) that meets the codes/standards of the safety/automation system 322.

In some further aspects, the processor 302 may implement different signaling/power control functionality on the first bus 308 and on the second bus 310, according to respective demands/requirements of the fire protection system 106 and the safety/automation system 322. For example, the processor 302 may execute different software to separately control the amount of power provided to the fire protection system 106 over the first bus 308 and to the safety/automation system 322 over the second bus 310. For example, the processor 302 may accomplish this by executing different software to separately control a first current measurement/control circuitry 304 on the first bus 308 and a second current measurement/control circuitry 306 on the second bus 310, as described in further detail below.

By separating the buses that serve the fire protection system 106 and the safety/automation system 322, the control panel 101 implements the functionality of both the fire protection system 106 and the safety/automation system 322 in a single box while still meeting the requirements of the fire protection system 106, without overly complicating the fire protection system 106 and the safety/automation system 322.

In some aspects, the control panel 101 implements separate current control functionality for the fire protection system 106 and the safety/automation system 322 such that current feedback from one system is not fed to the other system. For example, in some aspects, the control panel 101 includes the first current measurement/control circuitry 304 that is controlled by the processor 302 to implement current control on the first bus 308 that feeds the fire protection system 106, and the control panel 101 includes the second current measurement/control circuitry 306 that is separately controlled by the processor 302 to implement current control on the second bus 310 that feeds the safety/automation system 322.

For example, in some non-limiting aspects, for a 12V voltage supply level provided by the printed circuit board (PCB) at the control panel 101, the processor 302 may control the first current measurement/control circuitry 304 to set a 4 Amps current limit on the current drawn over the first bus 308 by the components of the fire protection system 106, while the processor 302 controls the second current measurement/control circuitry 306 to set a 2 Amps current limit on the current drawn over the second bus 310 by the components of the safety/automation system 322.

In some aspects, for example, the fire protection system 106 may include a fire panel 312 and/or one or more loop interface modules 316. The fire panel 312 and the loop interface modules 316 are powered by the control panel 101 via the first bus 308. Further, the fire panel 312 and the loop interface modules 316 communicate with the processor 302 in the control panel 101 via the first bus 308. Each loop interface module 316 may terminate a loop to which one or more fire protection devices are connected (e.g., in a daisy chain configuration). Each loop terminated by a loop interface module 316 may be connected to a number of fire protection devices (e.g., up to 120 or 256 fire protection devices), and the loop provides signal communication and power to the fire protection devices connected thereon.

The fire protection devices on a loop may include one or more initiating devices and/or one or more notification devices. The initiating devices may include fire detection devices such as smoke detectors, heat detectors, carbon monoxide (CO) detectors, etc. The notification devices may include audible and/or visual notification devices such as strobes, sirens, visual signs, etc.

In some non-limiting example aspects, one or more of the fire protection devices connected to a loop that is terminated by a loop interface module 316 may be addressable. In these aspects, the first bus 308 may include a pair of wires for selectively establishing signal/data communication with the addressable fire protection devices. In this case, the loop interface module 316 allows for addressing a particular fire protection device, for example, via the fire panel 312 and/or via the control panel 101. For example, the loop interface module 316 may allow for an addressable notification device to be selectively activated via the fire panel 312 and/or via the control panel 101. Also, for example, the loop interface module 316 may allow for an addressable initiating device to be selectively configured (e.g., for fire detection sensitivity, sleep time, etc.) via the fire panel 312 and/or via the control panel 101. Further, for example, the loop interface module 316 may allow for an addressable notification device that generated a signal to be individually identified by the fire panel 312 and/or the control panel 101.

In some non-limiting aspects, the safety/automation system 322 may include a second panel 314. For example, when the safety/automation system 322 is an intrusion system, the second panel 314 is an intrusion panel. Similarly, when the safety/automation system 322 is an access control system, the second panel 314 is an access control panel. Similarly, when the safety/automation system 322 is a building controls system, the second panel 314 is a building controls panel.

In some aspects, the functionality of the fire panel 312 may be implemented by the control panel 101. For example, the control panel 101 may implement a virtual fire panel for controlling the fire protection system 106. In some aspects, the functionality of the second panel 314 may be implemented by the control panel 101. For example, when the safety/automation system 322 is an intrusion system, the control panel 101 may implement a virtual intrusion panel for controlling the intrusion system. Similarly, when the safety/automation system 322 is an access control system, the control panel 101 may implement a virtual access control panel for controlling the access control system. Similarly, when the safety/automation system 322 is a building controls system, the control panel 101 may implement a virtual building controls panel for controlling the building controls system.

The safety/automation system 322 may also include one or more repeater modules 318 and/or one or more expander modules 320. The second panel 314, the repeater modules 318, and the expander modules 320 are powered by the control panel 101 via the second bus 310. Further, the second panel 314, the repeater modules 318, and the expander modules 320 communicate with the processor 302 in the control panel 101 via the second bus 310. Each expander module 320 is configured to expand the safety/automation system 322 by providing additional input/output connections for adding one or more sensors/devices to the safety/automation system 322. Each repeater module 318 is configured to boost the signal strength on the second bus 310 in order to increase the range of coverage of the safety/automation system 322, e.g., in order to increase the area covered by the sensors/devices in the safety/automation system 322.

In some cases, for example, one or more sensors/devices (e.g., a magnetic door/window sensor, a passive infrared (PIR) motion detector, etc., in an intrusion system) may be directly connected to the control panel 101, and the processor 302 may read the status of the sensors/devices and/or otherwise communicate with the sensors/devices over such direct connections to the control panel 101. However, the control panel 101 may have a limited number of such input/output connections. Accordingly, an expander module 320 (also referred to as a zone expander) may be used to increase the number of input/output connections for connecting additional sensors/device in the safety/automation system 322. In one non-limiting aspect, for example, an expander module 320 may include a terminal block providing a number of additional inputs/outputs or "zones" (e.g., 8 additional zones), where a zone refers to a sensor/device. The expander module 320 may multiplex the signals of these additional zones for signal communication with the processor 302 over the second bus 310.

In an aspect, each time a sensor/device is connected to one of the terminal inputs of the expander module 320, the expander module 320 indicates, via an addressing system, the addition of the sensor/device on the expander module 320 to the processor 302 over the bus 310. For example, the expander module 320 notifies the processor 302, over the second bus 310, that input 1 of zone expander 1 has been detected. The processor 302 may then update a mapping to indicate a zone expanded in an actual physical area.

In some aspects, the first bus 308 may include two wires for providing power and two wires for establishing differential signal communication, for example, according to the RS-485 protocol that allows for driving data over long-distance wiring.

In one non-limiting aspect, for example, the control panel 101 may include current measurement/control circuitry for one or more screwheads/connections to one or more connected systems. In some aspects, the current measurement/control circuitry may include a current measurement circuit and/or a current control circuit. For example, the control panel 101 may include the first current measurement/control circuitry 304 for the fire protection system 106 and the second current measurement/control circuitry for the safety/automation system 322. In this case, if a current measurement/control circuitry of a system indicates that the current supplied through a control panel screwhead/connection to that system has exceeded a maximum allowable current threshold (e.g., 6 Amps), the processor 302 may control the current control/measurement circuitry of that screwhead/connection to disconnect that screwhead/connection (e.g., by disconnecting a switch in a respective current measurement/control circuitry) and/or to drop the voltage on that screwhead/connection to reduce the current to an allowable level. Alternatively, or additionally, the current measurement/control circuitry of a screwhead/connection may implement a local analog current control mechanism (e.g., an op-amp feedback loop) to disconnect the screwhead/connection or reduce the amount of current if the current exceeds a threshold.

In some alternative or additional aspects, the control panel 101 may also include one or more screwheads/connections to one or more auxiliary devices/systems 333 with no current control/measurement circuitry at these screwheads/connections. These screwheads/connections may be allocated, for example, for one or more fire protection auxiliary outputs (e.g., a siren), one or more auxiliary outputs for an intrusion system (e.g., a camera), one or more optional devices installed by a customer (e.g., a doorbell camera), etc. The processor 302 may still deduce the amount of current drawn through the screwheads/connections of the auxiliary devices/systems 333 by subtracting the current drawn by the current-monitored connections (e.g., the connections having a current measurement/control circuitry thereon) from the total current drawn from the battery circuit 328. The processor 302 may then disconnect the screwheads/connections of the auxiliary devices/systems 333 if the deduced amount of current drawn by the screwheads/connections of the auxiliary devices/systems 333 exceeds a maximum allowable current threshold (e.g., exceeds 6 Amps).

In some alternative or additional aspects, the control panel 101 may also include one or more screwheads/connections to one or more low power systems 335 with no current control/measurement circuitry at these screwheads/connections. In one non-limiting example aspect, the low power systems 335 may include an access control system with occasional low power consumption (e.g., low current consumption only when an entrance/exit of a premises is accessed). In this case, the processor 302 may leave these connections ON and may not perform any current control regarding these screwheads/connections. These screwheads and connections may also include a fuse to get automatically/locally disconnected if needed.

Figure 4:
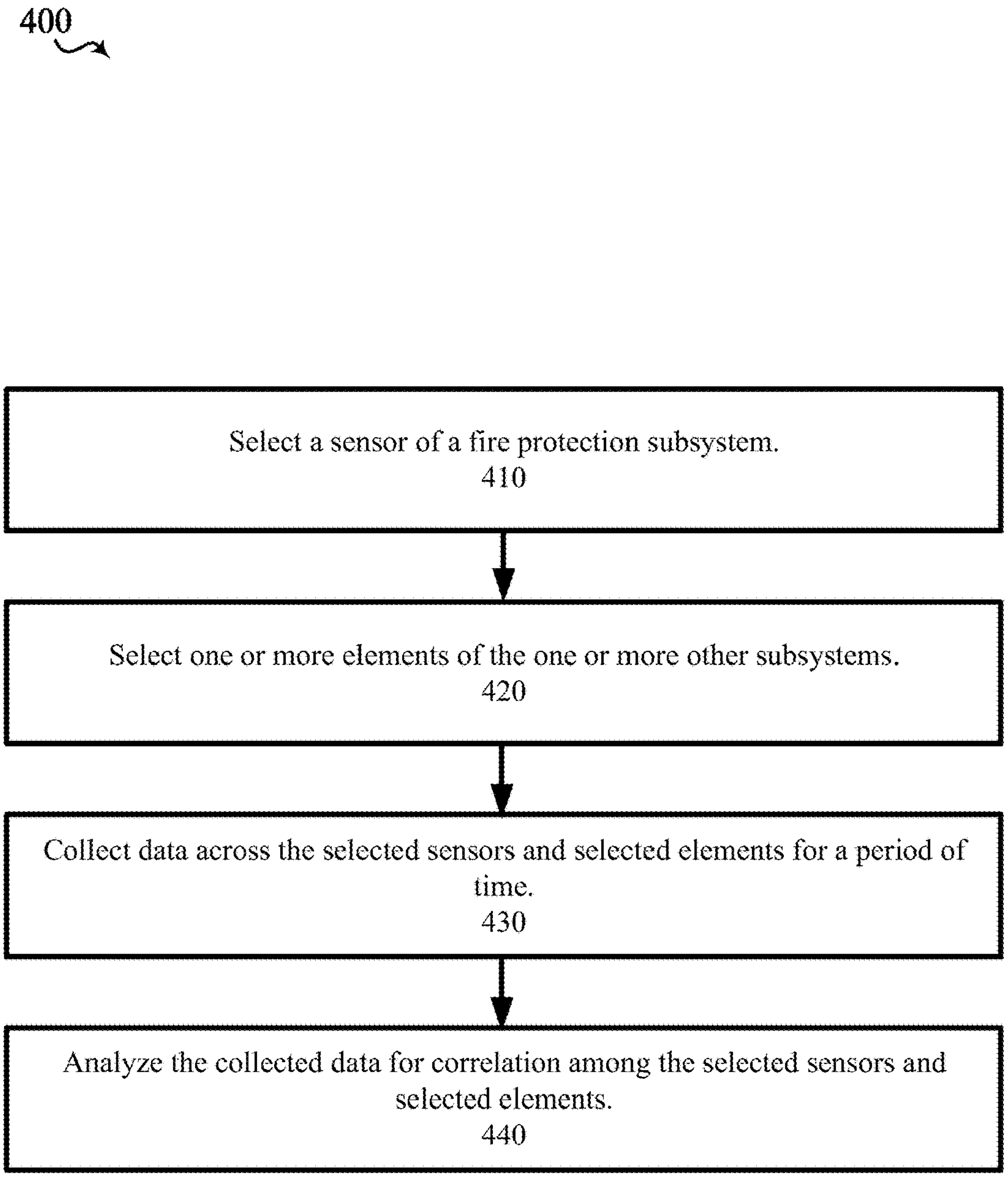
FIG. 4 is a block diagram of methods for operating premises systems is show, in accordance with examples of the technology disclosed herein.

Referring to FIG. 4, and continuing to refer to prior figures for context, a block diagram of methods 400 for operating premises systems is show, in accordance with examples of the technology disclosed herein. The premises system 100 includes a fire protection subsystem 106 and one or more other subsystems, e.g., intrusion system 102, access control system 104, and building controls system 108.

In such methods 400, the premises system 100 selects a sensor of a fire protection subsystem—Block 410. In a continuing example, fire protection subsystem 106 monitors a series of sensors for various sub-alarm conditions, including a rate-of-rise heat sensor deployed in a vestibule of the premises. The rate-of-rise heat sensor avoids reaching alarm conditions, but does sense a sub-alarm threshold previously set by a user of the system.

The premises system 100 selects one or more elements of one more other systems—Block 420. In the continuing example, a door switch of the access control system 104 and a unit heater of the building controls system 108 are selected by the premises system 100 based on those elements of the other systems being located in proximity (e.g., the same room) to the rate-of-rise heat sensor. In some examples, raw physical proximity (e.g., a radius) to the selected fire safety sensor can be used. In some examples, the range of the selected sensor (e.g., a field of view of a camera) can be used to indicate proximity. Building intrusion system 102 elements also can be selected by the premises system 100.

The premises system 100 collects data across the selected sensors and selected elements for a period of time—Block 430. In the continuing example, the premises system 100 determines collects data for five minutes (selectable by a user) showing a significant, but sub-alarm (nearly alarm) increase in the values from the rate-of-rise heat sensor of the fire protection system 106 and an increased current draw from the unit heater of the building controls system 108 in the minute after the door switch of the access control system 104 operates. In some examples, for the period of data collection the premises system 100 increases the resolution of one or more of the time and sensor granularity of at least one selected sensor, e.g., sampling ten times per second versus once per second and with a resolution of 0.1 degree rise per second resolution for the rate-of-rise heat sensor instead of a nominal one degree rise per minute resolution.

The premises system 100 analyzes the collected data for correlation among the selected sensors and selected elements—Block 440. In the continuing example, the premise system 100 uses an artificial intelligence neural network that leverages regression analysis and artificial intelligence (e.g., expert systems and machine learning) for estimating the correlations and relationships between the data. In this case, the temporal correlation between the door switch of the access control system 104 (operating first), the rise in current draw from the unit heater of the building controls system 108 (rising second), and the rate-of-rise heat sensor of the fire protection system 106 (lagging the rise in current draw from the unit heater of the building controls system 108) suggests a causal relationship.

Figure 5:
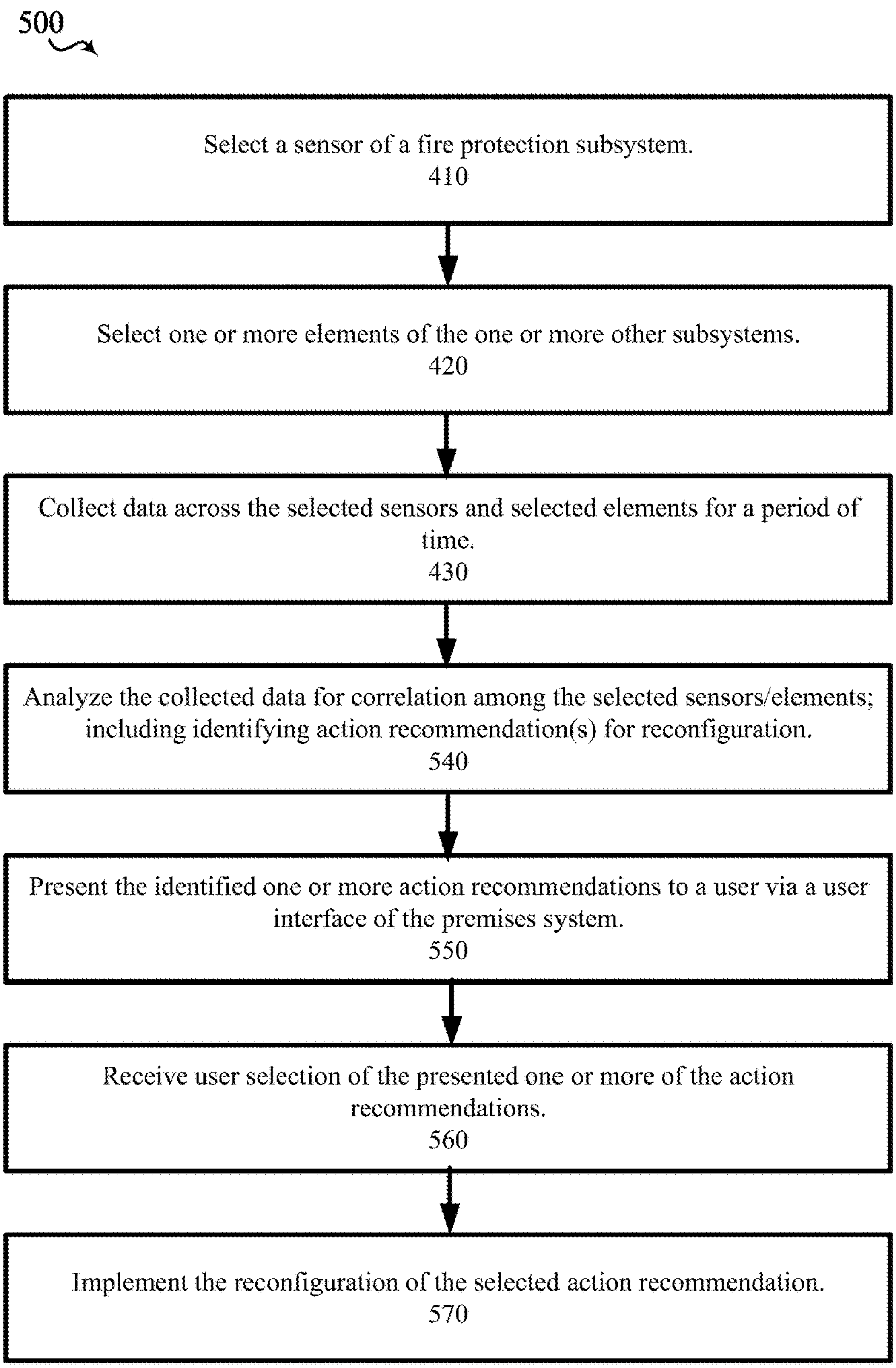
FIG. 5 is a block diagram of methods for operating premises systems is show, in accordance with examples of the technology disclosed herein.

Referring to FIG. 5, and continuing to refer to prior figures for context, a block diagram of methods 500 for operating premises systems is show, in accordance with examples of the technology disclosed herein. In such methods 500, Block 410-Block 430 are performed as described above in connection with FIG. 4.

In such methods, after the premises system 100 has collected data across the selected sensors and selected elements for a period of time, the analysis described in conjunction with FIG. 4 further includes identifying one or more action recommendations for reconfiguration of the premises system—Block 540. In the continuing example, the premises system 100, using an expert system, identifies [1] temporarily raising the alarm level for the rate-of-rise heat sensor of the fire protection system 106 for one minute after the door switch of the access control system 104 operates, [2] introducing a more substantial hysteresis to the operation of the unit heater of the building controls system 108, [3] using temperature signals, instead of rate-of-rise signals from the rate-of-rise heat sensor of the fire protection system 106 as an alarm trigger.

The premises system 100 then presents the identified one or more action recommendations to a user via a user interface (e.g., user interface 610 described below) of the premises system 100—Block 550. In the continuing example, the premises system 100 presents the three options: [1] temporarily raising the alarm level for the rate-of-rise heat sensor of the fire protection system 106 for one minute after the door switch of the access control system 104 operates, [2] introducing a more substantial hysteresis to the operation of the unit heater of the building controls system 108, [3] using temperature signals, instead of rate-of-rise signals from the rate-of-rise heat sensor of the fire protection system 106 as an alarm trigger.

The premises system 100 receives user selection of the presented one or more action recommendations—Block 560. In the continuing example, the premises system 100 receives user selection of [3] using temperature signals, instead of rate-of-rise signals from the rate-of-rise heat sensor of the fire protection system 106 as an alarm trigger.

The premises system 100 implements the reconfiguration of the selected action recommendation—Block 570. In the continuing example, the premises system 100 reconfigures the rate-of-rise heat sensor of the fire protection system 106 to provide temperature signals in addition to rate-of-rise signals.

Figure 6:
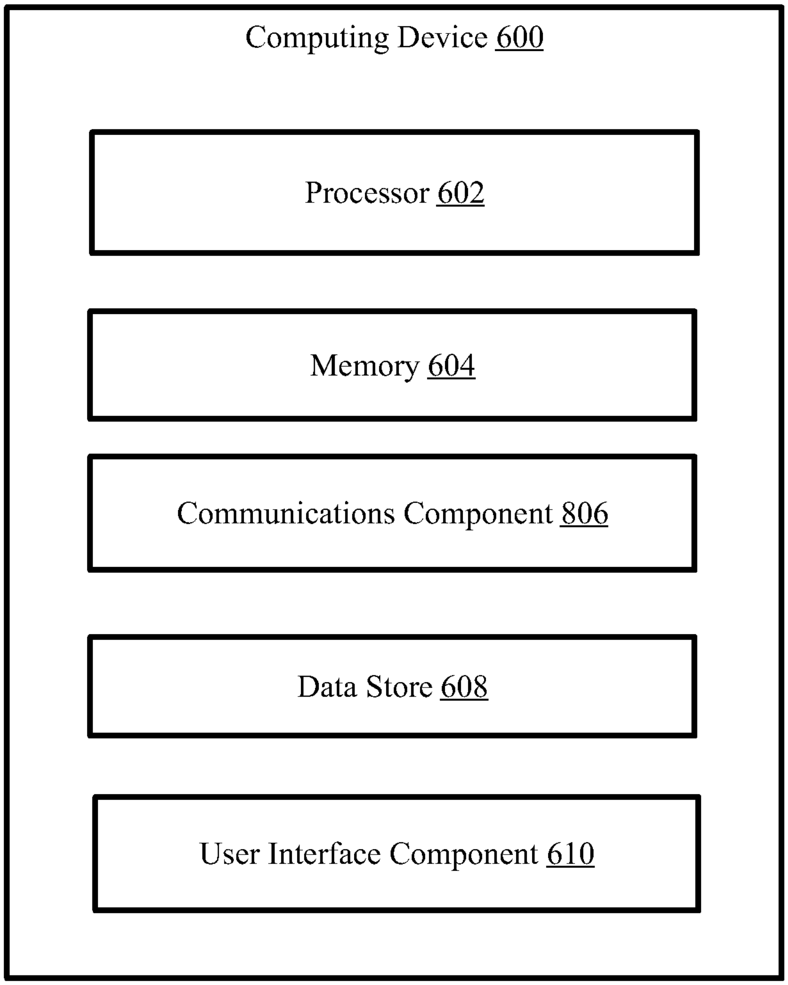
FIG. 6 is a block diagram of an example computing device which may implement all or a portion of any component of the technology disclosed herein, in accordance with examples of the technology disclosed herein.

Referring to FIG. 6, an example block diagram provides details of computing components in a computing device 600 that may implement all or a portion of the premises environment platform 100, the control panel 101, the intrusion system 102, the fire protection system 106, the access control system 104, the building controls system 108, the cloud system 110, the fire panel 312, the second panel 314, the loop interface module(s) 316, the repeater module(s) 318, the expander module(s) 320, the processor 302, the battery management algorithm 330, or any other component described above with reference to FIGS. 1-5. The computing device 600 includes a processor 602 which may be configured to execute or implement software, hardware, and/or firmware modules that perform any functionality described above with reference to the premises environment platform 100, the control panel 101, the intrusion system 102, the fire protection system 106, the access control system 104, the building controls system 108, the cloud system 110, the fire panel 312, the second panel 314, the loop interface module(s) 316, the repeater module(s) 318, the expander module(s) 320, the processor 302, the battery management algorithm 330, or any other component described above with reference to FIGS. 1-5. For example, the computing device 600 may implement the control panel 101, in which case the processor 602 may be the processor 302 configured to execute the battery management algorithm 330 to perform any battery management functionality described herein, such as, but not limited to, any battery management functionality described above with reference to FIGS. 1-5.

The processor 602 may be a micro-controller and/or may include a single or multiple set of processors or multi-core processors. Moreover, the processor 602 may be implemented as an integrated processing system and/or a distributed processing system. The computing device 600 may further include a memory 604 (a non-transitory computer-readable medium), such as for storing local versions of applications being executed by the processor 602, related instructions, parameters, etc. The memory 604 may include a type of memory usable by a computer, such as random-access memory (RAM), read only memory (ROM), tapes, magnetic discs, optical discs, volatile memory, non-volatile memory, and any combination thereof. Additionally, the processor 602 and the memory 604 may include and execute an operating system executing on the processor 602, one or more applications, display drivers, etc., and/or other components of the computing device 600.

Further, the computing device 600 may include a communications component 606 that provides for establishing and maintaining communications with one or more other devices, parties, entities, etc., utilizing hardware, software, and services. The communications component 606 may carry communications between components on the computing device 600, as well as between the computing device 600 and external devices, such as devices located across a communications network and/or devices serially or locally connected to the computing device 600. For example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, which provides for mass storage of information, databases, and programs. For example, the data store 608 may be or may include a data repository for applications and/or related parameters not currently being executed by processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for operating a premises system, the premises system comprising a fire protection subsystem and one or more other subsystems, the method comprising:

selecting a rate-of-rise heat sensor of the fire protection subsystem, the fire protection subsystem being communicatively coupled to a control panel having a first bus for the fire protection subsystem and a separate second bus for the one or more other subsystems, the first and second buses being electrically isolated and each coupled to distinct current measurement and current control circuitry;

selecting one or more elements of the one or more other subsystems;

collecting data across the rate-of-rise heat sensor and selected elements for a period of time; receiving, via the first bus, data from the rate-of-rise heat sensor during the period of time;

receiving, via the second bus, data comprising a state of a door switch of an access control system and a current draw of a unit heater of a building controls system during the period of time;

analyzing the collected data for correlation among the rate-of-rise heat sensor and selected elements;

determining a temporal correlation in which the door switch operates first, the current draw of the unit heater increases second, and a rate-of-rise signal from the rate-of-rise heat sensor lags the increase in current draw;

identifying a causal relationship among the door switch operating, the current draw of the unit heater increasing, and the rate-of-rise signal lagging the increase in current draw;

identifying one or more action recommendations for reconfiguration of the premises system, the one or more action recommendations including using temperature signals, instead of rate-of-rise signals from the rate-of-rise heat sensor, as an alarm trigger;

presenting the identified one or more action recommendations to a user via a user interface of the premises system;

receiving a user selection of one of the one or more action recommendations; and implementing the reconfiguration of the selected action recommendation.

2. The method of claim 1, wherein selecting the rate-of-rise heat sensor is automatically performed by the premises system based on a predetermined sub-alarm threshold level for the rate-of-rise heat sensor.

3. The method of claim 1, wherein selecting one or more element is based on physical proximity of an element with the rate-of-rise heat sensor.

4. The method of claim 3, wherein physical proximity comprises a physical range of the rate-of-rise heat sensor.

5. The method of claim 1, wherein other subsystems comprise one or more of the access control system, an intrusion subsystem, and the building system.

6. The method of claim 5, wherein one or more elements comprise one or more of a thermometer, a camera, a beacon/sounder pull station, a smoke detector, a thermostat, an intrusion motion sensor, an access card reader, an access keypad, and a door contact.

7. The method of claim 1, wherein collecting comprises increasing a resolution in one or more of time and sensor granularity of at least one selected sensor for the period of time.

8. A premises system, comprising:

a fire safety subsystem; at least one other subsystem;

a memory; and at least one processor coupled to the memory, the memory including instructions executable by the at least one processor to cause the premises system to:

select a rate-of-rise heat sensor of the fire protection subsystem, the fire protection subsystem being communicatively coupled to a control panel having a first bus for the fire protection subsystem and a separate second bus for the one or more other subsystems, the first and second buses being electrically isolated and each coupled to distinct current measurement and current control circuitry;

select one or more elements of the at least one other subsystem;

collect data across the rate-of-rise heat sensor and elements for a period of time;

receive, via the first bus, data from the rate-of-rise heat sensor during the period of time;

receive, via the second bus, data comprising a state of a door switch of an access control system and a current draw of a unit heater of a building controls system during the period of time;

analyze the collected data for correlation among the rate-of-rise heat sensor and elements;

determine a temporal correlation in which the door switch operates first, the current draw of the unit heater increases second, and a rate-of-rise signal from the rate-of-rise heat sensor lags the increase in current draw;

identify a causal relationship among the door switch operating, the current draw of the unit heater increasing, and the rate-of-rise signal lagging the increase in current draw;

identify one or more action recommendations for reconfiguration of the premises system, the one or more action recommendations including using temperature signals, instead of rate-of-rise signals from the rate-of-rise heat sensor, as an alarm trigger;

present the identified one or more action recommendations to a user via a user interface of the premises system;

receive a user selection of one of the one or more action recommendations; and implement the reconfiguration of the selected action recommendation.

9. The system of claim 8, wherein selecting the rate-of-rise heat sensor is automatically performed by the premises system based on a predetermined sub-alarm threshold level for the rate-of-rise heat sensor.

10. The system of claim 8, wherein selecting one or more element is based on physical proximity of an element with the rate-of-rise heat sensor.

11. The system of claim 10, wherein physical proximity comprises a physical range of the rate-of-rise heat sensor.

12. The system of claim 8, wherein other subsystems comprise one or more of the access control system, an intrusion subsystem, and the building controls system.

13. A non-transitory computer-readable medium storing processor-executable code, the code when read and executed by at least one processor of a premises system comprising a fire safety subsystem and at least one other subsystem, causes the premises system to:

select a rate-of-rise heat sensor of the fire protection subsystem, the fire protection subsystem being communicatively coupled to a control panel having a first bus for the fire protection subsystem and a separate second bus for the one or more other subsystems, the first and second buses being electrically isolated and each coupled to distinct current measurement and current control circuitry;

select one or more elements of the one or more other subsystems;

collect data across the rate-of-rise heat sensor and elements for a period of time;

receive, via the first bus, data from the rate-of-rise heat sensor during the period of time;

receive, via the second bus, data comprising a state of a door switch of an access control system and a current draw of a unit heater of a building controls system during the period of time;

analyze the collected data for correlation among the rate-of-rise heat sensor and elements;

determine a temporal correlation in which the door switch operates first, the current draw of the unit heater increases second, and a rate-of-rise signal from the rate-of-rise heat sensor lags the increase in current draw;

identify a causal relationship among the door switch operating, the current draw of the unit heater increasing, and the rate-of-rise signal lagging the increase in current draw;

identify one or more action recommendations for reconfiguration of the premises system, the one or more action recommendations including using temperature signals, instead of rate-of-rise signals from the rate-of-rise heat sensor, as an alarm trigger;

present the identified one or more action recommendations to a user via a user interface of the premises system;

receive a user selection of one of the one or more action recommendations; and implement the reconfiguration of the selected action recommendation.

14. The non-transitory computer-readable medium of claim 13, wherein selecting the rate-of-rise heat sensor is automatically performed by the premises system based on a predetermined sub-alarm threshold level for the rate-of-rise heat sensor.

15. The non-transitory computer-readable medium of claim 13, wherein selecting one or more element is based on physical proximity of an element with the rate-of-rise heat sensor.

16. The non-transitory computer-readable medium of claim 15, wherein physical proximity comprises a physical range of the rate-of-rise heat sensor.

* * * * *